Figure 1:
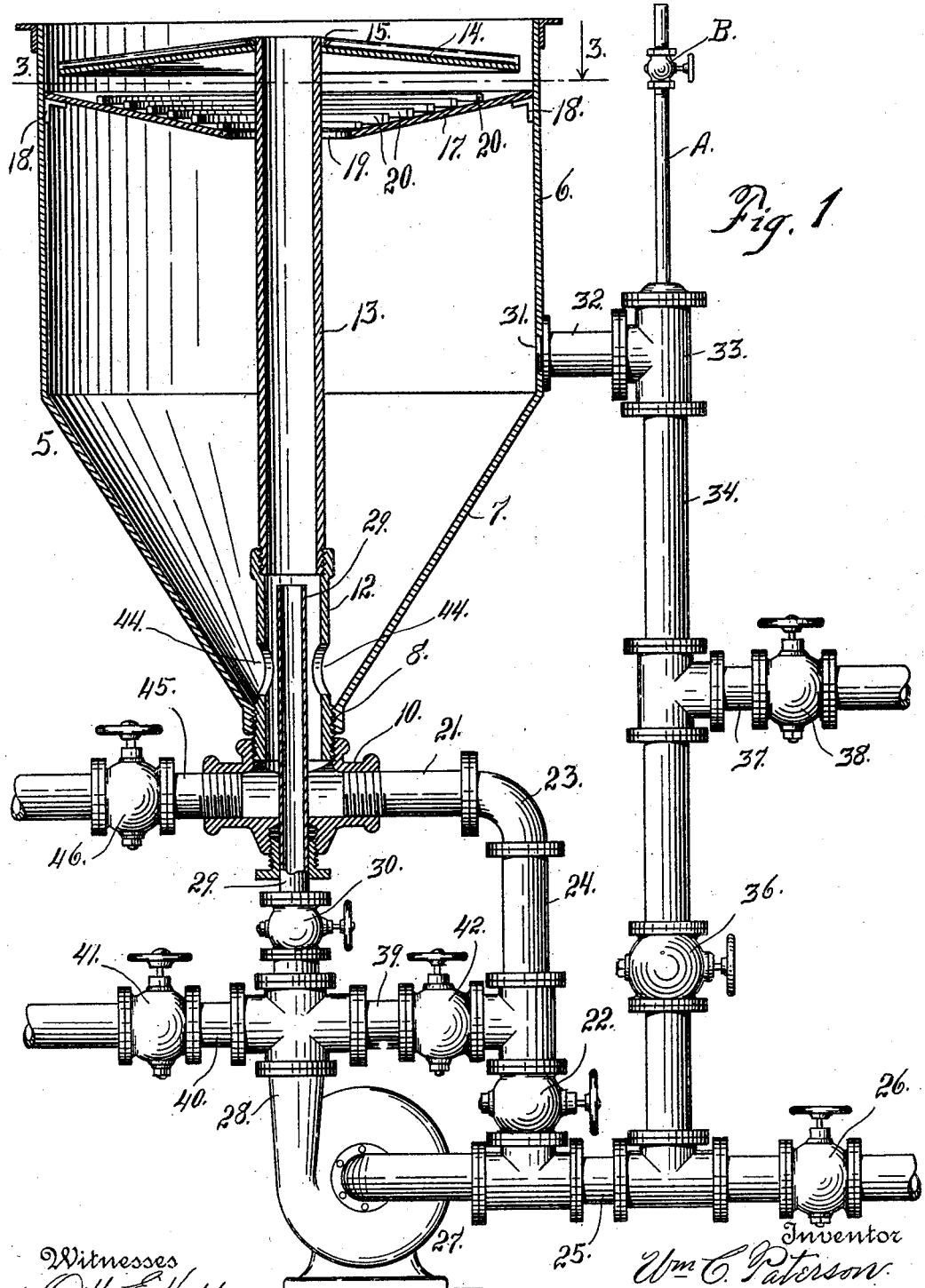

UNITED STATES PATENT OFFICE.

WILLIAM CAMPBELL PATERSON, OF DENVER, COLORADO.

PULP-AGITATOR.

940,612.  Specification of Letters Patent.  Patented Nov. 16, 1909.

Application filed May 24, 1909. Serial No. 497,923.

*To all whom it may concern:*

Be it known that I, WILLIAM CAMPBELL PATERSON, a subject of Great Britain, residing in the city and county of Denver and State of Colorado, have invented certain new and useful Improvements in Pulp-Agitators; and I do declare the following to be a full, clear, and exact description of the invention, such as will enable other skilled in the art to which it appertains to make and use the same, reference being had to the accompanying drawings, and to the letters and figures of reference marked thereon, which form a part of this specification.

My invention relates to improvements in apparatus for agitating pulp of any character, although it is particularly adapted for use in the agitation and aeration of pulp composed of pulverized ore and the necessary solution for dissolving its metallic values; and, to be still more specific, the special object which I have in mind is the treatment of pulp formed from pulverized ore and a solution of cyanid of potassium, for the purpose of facilitating the dissolving of the metallic values through the action of the chemicals.

My object is, to thoroughly agitate and aerate the pulp, whereby the values to be dissolved are more advantageously subjected to the action of the dissolving chemicals, thus greatly shortening the time during which it is necessary for the ore to remain in contact with the solution.

My improved construction includes a funnel-shaped tank occupying a vertical position and having a centrally disposed pipe open at its upper extremity to allow the pulp which is carried upwardly through the pipe, to overflow at its top and run back into the tank. The lower extremity of the pipe communicates with the body of the tank, whereby the pulp may be circulated from the bottom of the tank to the top, the pulp being kept in continuous motion until the metallic values are thoroughly dissolved. Provision is made for decanting or removing the solution containing the metallic values, and also for the separate removal of the solid material which, after agitation is completed, is allowed to settle in the lower part of the tank. For the better agitation of the pulp, the upper part of the tank is provided with a downwardly inclined riffled plate over which the pulp flows after being discharged from the upper extremity of the centrally located pipe. At the top of this pipe is a disk, provided with a number of depressed run-ways through which the pulp flows to the outer portion of the tank, being discharged therefrom upon the outer edge of the riffled plate, which is downwardly inclined from the outer wall of the tank, as heretofore indicated.

My present invention has special reference to means for aerating the pulp during agitation. The features disclosed but not claimed therein are claimed in my Letters Patent No. 923,571, dated June first, 1909.

Having briefly outlined my improved construction, I will proceed to describe the same in detail, reference being made to the accompanying drawing, in which is illustrated an embodiment thereof.

Figure 2:
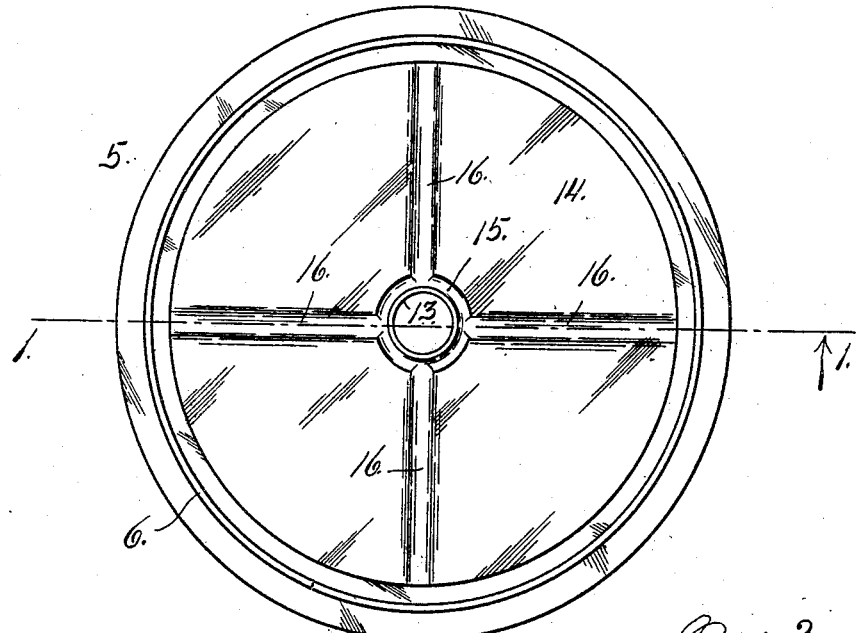
Figure 3:
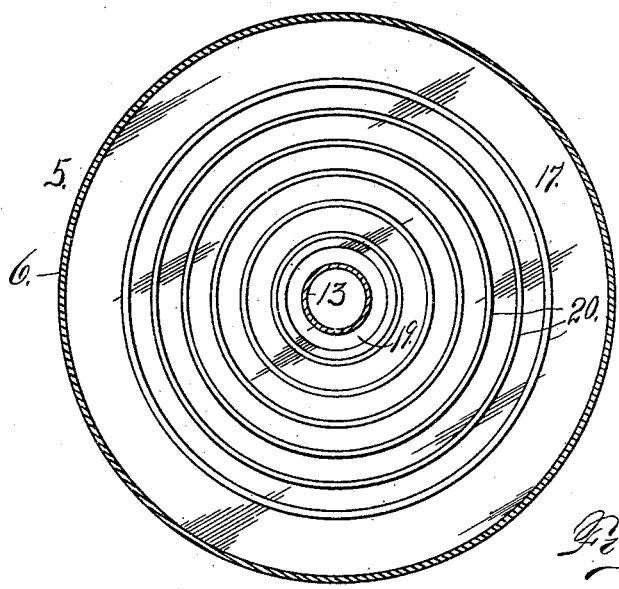

In this drawing, Figure 1 is a vertical section taken through the tank of my improved structure, the pipe connections being for the most part shown in elevation. Fig. 2 is a top plan view of the tank. In this view the pipe connections are not illustrated. Fig. 3 is a section taken through the tank on the line 3—3, Fig. 1, looking downwardly, the pipe connections not being illustrated, since their use has been clearly shown in Fig. 1.

The same reference characters indicate the same parts in all the views.

Let the numeral 5 designate an upright tank, which, as shown in the drawing, is funnel-shaped, its upright part 6 being cylindrical in shape and its lower part 7, cone-shaped. The lower extremity of the tank is interiorly threaded, as shown at 8, and into it is screwed the lower extremity of a pipe section 12, which projects upwardly into the tank. The lower threaded extremity of this pipe section projects below the bottom of the tank, and upon it is screwed a fitting 10 extending at right angles to the pipe 12, into whose upper extremity is threaded a vertically disposed pipe 13, centrally located in the tank. The upper extremity of the pipe 13 is attached to a disk 14 which, as shown in the drawing, is provided with a circular groove 15 which immediately surrounds the upper extremity of the pipe. From this circular groove, a number of radially disposed run-ways 16 lead outwardly and downwardly, terminating at the edge of the disk which is removed a short distance from the inner surface of the wall of the tank.

Located below the disk 14, is a plate 17 whose outer edge is secured to brackets 18 attached to the inner surface of the wall of the tank. From the outer edge of this plate, the latter is downwardly inclined, but cut away around the pipe 13, as shown at 19, to allow the pulp to discharge into the tank around the pipe after it has passed downwardly over the plate. This plate, as shown in the drawing is provided with a series of circular riffles 20 which are parallel the one with the other, the outer riffles being largest, and the other riffles diminishing in diameter as they extend downwardly.

Connected with one extremity of the fitting 10 below the bottom of the tank is a pipe 21. This tank is provided with an elbow 23 from which a branch 24 leads downwardly and communicates with a supply pipe 25 provided with a valve 26. One extremity of the pipe 25 communicates with a source of pulp, not shown, for supplying the tank; while the opposite extremity of this pipe communicates with a centrifugal pump 27, from which a pipe 28 leads upwardly to a pipe 29 which extends through the fitting 10 and into the pipe section 12, terminating approximately at the lower extremity of the pipe 13. It will be understood that when the pump 27 is in motion, the pulp may be drawn through the pipe 25 and discharged through the pipes 28 and 29 into the tank, being forced upwardly through the pipe 13. The pipe 28 is provided with a valve 30.

Connected with the tank 5, as shown at 31, and just above the cone-shaped lower portion 7, is a pipe 32 communicating with a depending stand pipe 34 by a fitting 33. The pipe 34 is provided with a valve 36, and also connected with a pipe 37 having a valve 38. The function of this pipe 37 is to decant or remove the solution containing the dissolved metallic values after agitation is completed.

Communicating with the upper extremity of the fitting 33 is an air inlet pipe A having a valve B. By means of this pipe, the contents of the tank are aerated during agitation, as hereinafter more fully explained.

Connected with the pipe section 24 is a horizontally disposed pipe 39 which communicates with the pipe 28, and is provided with a valve 42. The pipe section 24 is provided with a valve 22 located therein between the pipe 39 and the supply pipe 25. A branch pipe 40 is in alinement with the pipe 39, and also in communication with the pipe 28. This pipe 40 is provided with a valve 41.

From the foregoing description, the use and operation of my improved mechanism will be readily understood. Assuming that the tank is empty, it will be first necessary to fill the same, and this this end the centrifugal pump 27 is set in motion. In this event, the valves 36, 22, 42, and 41 may be closed, while the valves 26 and 30 are left open. It must be assumed that the pipe 25 is in communication with a suitable source of pulp for supplying the tank 5. As the pump 27 is operated, this pulp is discharged through the pipe 29 and the pipe 13, into the tank, until the latter is filled, or, until the pulp therein has risen to the desired level. This level preferably should be below the riffled plate 17, in order that the pulp when subjected to the agitation incident to the use of the machine, may flow unobstructed over the disk 14 and the riffled plate 17.

Assuming now that the tank is fully charged with pulp, the valve 26 is closed, and the valve 36 opened. The pump 27 is now set in motion and the pulp is taken from the tank 5 through the pipe sections 32, 33, and 34, and delivered to the pipe 25, whence it passes through the pump and upwardly through the pipes 28, 29, and 13. At the upper extremity of the pipe 13, the pulp is discharged upon the disk 14 and passes downwardly to the outer edge thereof, where it is discharged to the outer edge of the inclined riffled plate 17, over which it passes until finally discharged into the tank through the opening 19 around the pipe 13. The discharge at the mouth of the pipe 29 creates a partial vacuum which causes the pulp in the lower part of the tank to pass into the pipe section 12 through openings 44 formed therein. In this manner the entire contents of the tank are circulated, whereby they are subjected to the necessary agitation, in order to dissolve the metallic values in the most thorough and rapid manner.

During the agitation of the contents of the tank, as just explained, air is drawn into the pipe 34 through the pipe A (the valve B being open), and mingled with the pulp taken from the tank in the manner just explained. By virtue of the air pipe A, atmospheric air may be continuously supplied to the pulp during the process of agitation, whereby the air is carried with the pulp with the result that the contents of the tank are thoroughly agitated during the treatment of the ore in the manner explained. This aeration of the pulp is important in a construction of this class. In the event that the machine is employed for agitating substances which do not require aeration, the valve B may be closed. This valve also makes it practicable to regulate the entrance of air to the pulp while the latter is under treatment.

By virtue of my improved construction, it becomes practicable to accomplish in a few hours what would require possibly several days without agitation.

After the pulp has been thoroughly agitated and the metallic values dissolved, the pump is stopped and the pulp allowed to settle in the tank, whereby its solid portion accumulates in the lower conical portion of the same below the connection of the pipe 32 with the tank. After this occurs, the solution containing the dissolved metallic values is drawn off from the tank through the pipe sections 32 and 34. In order to accomplish this the valve 36 is closed and the valve 38 opened. Any suitable means may be connected with the pipe 37 for decanting the solution. It may be allowed to flow by gravity, or a pump or suction apparatus, of any desired construction may be employed.

After the solution has been removed from the tank, the valves 36, 26, 42 and 30 are closed, and the valves 22 and 41 opened. Now, the pump 27 is set in motion, and it acts to remove the solid material from the lower part of the tank, and discharge the same through the pipe 28 to any desired location.

In case the pipe composed of the elements 21, 23 and 24 should become stopped up with solid material, it may be cleaned out by pumping liquid from the tank through the pipe composed of the elements 32 and 34, the pipe 25, the pipe sections 28 and 39, and up through the pipes 24, 23 and 21. In order to accomplish this, the valves 22, 38, 26, 30 and 41 are left closed, while the valves 36 and 42 are left open.

Attention is called to the fact that the weight of the pulp in the tank 5 supplements the suction or partial vacuum produced by the introduction of the liquid through the pipe 29 into the pipe 13, thus diminishing the power which otherwise would be required to produce the circulation of the pulp within the tank.

Connected with the extremity of the fitting 10 opposite the pipe 21 is a pipe 45 having a valve 46. The function of this pipe is to drain the tank by gravity, when for any reason it may be necessary or desirable to do so.

Having thus described my invention, what I claim is:—

1. The combination of an upright tank having a conical bottom, a centrally disposed pipe located in the said tank, its lower portion being in communication with the tank, an inlet pipe projecting upwardly through the bottom of the tank and entering the centrally located pipe, a pulp supply pipe for delivering fluid to the tank, through the inlet pipe and the centrally located pipe, a valve-controlled branch pipe communicating at one extremity with the body of the tank at a suitable point above the bottom, an air pipe connected with the said branch pipe, and pulp circulating means interposed between the pulp supply pipe and the said branch pipe, substantially as described.

2. The combination of an upright tank having a conical bottom, an inlet pipe projecting upwardly through the bottom of the tank, a pulp supply pipe for delivering fluid to the tank through the inlet pipe, a stand pipe connected at one extremity with the tank at a suitable point above the bottom, an air pipe open to the atmosphere, connected with the stand pipe and projecting above the level of the liquid in the tank, and a pump interposed between the inlet pipe and the stand pipe, for the purpose set forth.

In testimony whereof I affix my signature in presence of two witnesses.

WILLIAM CAMPBELL PATERSON.

Witnesses:
   A. J. O'BRIEN,
   A. EBERT O'BRIEN.